(12) United States Patent
Winden

(10) Patent No.: US 11,718,243 B2
(45) Date of Patent: *Aug. 8, 2023

(54) VEHICULAR CAMERA SYSTEM WITH FORWARD VIEWING CAMERA

(71) Applicant: Magna Electronics Inc., Auburn Hills, MI (US)

(72) Inventor: Brian J. Winden, Rochester, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/448,060

(22) Filed: Sep. 20, 2021

(65) Prior Publication Data

US 2022/0001812 A1   Jan. 6, 2022

Related U.S. Application Data

(63) Continuation of application No. 16/527,634, filed on Jul. 31, 2019, now Pat. No. 11,124,130.

(Continued)

(51) Int. Cl.
| | | |
|---|---|---|
| *B60R 11/04* | (2006.01) | |
| *B62D 65/14* | (2006.01) | |
| *H04N 5/225* | (2006.01) | |
| *H04N 23/51* | (2023.01) | |
| *H04N 23/54* | (2023.01) | |
| *H04N 23/55* | (2023.01) | |
| *B60R 11/00* | (2006.01) | |
| *B60R 1/00* | (2022.01) | |

(52) U.S. Cl.
CPC ............ *B60R 11/04* (2013.01); *B62D 65/14* (2013.01); *H04N 23/51* (2023.01); *H04N 23/54* (2023.01); *H04N 23/55* (2023.01); *B60R 1/00* (2013.01); *B60R 2011/0026* (2013.01); *B60R 2300/105* (2013.01); *B60R 2300/30* (2013.01); *B60R 2300/607* (2013.01)

(58) Field of Classification Search
None
See application file for complete search history.

(56) References Cited

U.S. PATENT DOCUMENTS 6,690,268 B2   2/2004   Schofield et al.
6,824,281 B2   11/2004  Schofield et al.
(Continued)

*Primary Examiner* — Mohammad J Rahman
(74) *Attorney, Agent, or Firm* — Honigman LLP

(57) ABSTRACT

A vehicular camera system includes an attaching structure configured to attach at an in-cabin side of a vehicle windshield. A camera module accommodates a circuit board and an imager and the camera module includes a lens aligned with the imager. The attaching structure includes a camera module receiving portion having an opening at a lower portion of the camera module receiving portion. With the attaching structure attached at the in-cabin side of the vehicle windshield, the camera module is inserted upward through the opening and is at least partially received in the camera module receiving portion to attach the camera module at the camera module receiving portion. With the attaching structure attached at the in-cabin side of the vehicle windshield and with the camera module at least partially received in the camera module receiving portion, the imager views through the vehicle windshield and forward of the vehicle.

32 Claims, 23 Drawing Sheets

Related U.S. Application Data

(60) Provisional application No. 62/713,082, filed on Aug. 1, 2018.

(56) References Cited

U.S. PATENT DOCUMENTS

| | | |
|---|---|---|
| 7,038,577 B2 | 5/2006 | Pawlicki et al. |
| 7,262,406 B2 | 8/2007 | Heslin et al. |
| 7,265,342 B2 | 9/2007 | Heslin et al. |
| 7,420,159 B2 | 9/2008 | Heslin et al. |
| 7,480,149 B2 | 1/2009 | DeWard et al. |
| 7,533,998 B2 | 5/2009 | Schofield et al. |
| 7,538,316 B2 | 5/2009 | Heslin et al. |
| 7,720,580 B2 | 5/2010 | Higgins-Luthman |
| 7,855,755 B2 | 12/2010 | Weller et al. |
| 7,916,009 B2 | 3/2011 | Schofield et al. |
| 8,179,437 B2 | 5/2012 | Schofield et al. |
| 8,256,821 B2 | 9/2012 | Lawlor et al. |
| 8,400,560 B1 | 3/2013 | Yang |
| 8,405,726 B2 | 3/2013 | Schofield et al. |
| 8,694,224 B2 | 4/2014 | Chundrlik, Jr. et al. |
| 8,818,042 B2 | 8/2014 | Schofield et al. |
| 8,886,401 B2 | 11/2014 | Schofield et al. |
| 8,917,169 B2 | 12/2014 | Schofield et al. |
| 9,068,390 B2 | 6/2015 | Ihlenburg et al. |
| 9,077,098 B2 | 7/2015 | Latunski |
| 9,077,962 B2 | 7/2015 | Shi et al. |
| 9,090,234 B2 | 7/2015 | Johnson et al. |
| 9,092,986 B2 | 7/2015 | Salomonsson et al. |
| 9,140,789 B2 | 9/2015 | Lynam |
| 9,146,898 B2 | 9/2015 | Ihlenburg et al. |
| 9,174,574 B2 | 11/2015 | Salomonsson |
| 9,205,776 B2 | 12/2015 | Turk |
| 9,233,641 B2 | 1/2016 | Sesti et al. |
| 9,380,219 B2 | 6/2016 | Salomonsson et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 11,124,130 B2 | 9/2021 | Winden |
| 2003/0059217 A1* | 3/2003 | Baek ..................... B60R 11/04 396/427 |
| 2006/0061008 A1* | 3/2006 | Karner ..................... B60R 1/06 264/250 |
| 2011/0233248 A1* | 9/2011 | Flemming ............... B60R 11/02 224/482 |
| 2012/0153154 A1 | 6/2012 | Rothenhaeusler et al. |
| 2013/0184990 A1 | 7/2013 | Stahlin |
| 2014/0043465 A1 | 2/2014 | Salomonsson et al. |
| 2014/0160284 A1 | 6/2014 | Achenbach et al. |
| 2014/0226012 A1 | 8/2014 | Achenbach |
| 2014/0362219 A1 | 12/2014 | Seger et al. |
| 2014/0375075 A1 | 12/2014 | Liao et al. |
| 2015/0015713 A1 | 1/2015 | Wang et al. |
| 2015/0251605 A1 | 9/2015 | Uken et al. |
| 2016/0119527 A1 | 4/2016 | Shahid et al. |
| 2016/0264063 A1 | 9/2016 | Toma et al. |
| 2016/0318457 A1* | 11/2016 | Nakano ..................... B60R 11/04 |
| 2016/0318458 A1* | 11/2016 | Wato ..................... B60R 11/04 |
| 2017/0113613 A1 | 4/2017 | Van Dan Elzen et al. |
| 2017/0257536 A1 | 9/2017 | Takama et al. |
| 2019/0346126 A1* | 11/2019 | Wada ..................... H04N 5/225 |

\* cited by examiner

Top Views – Solid and Transparent Brackets

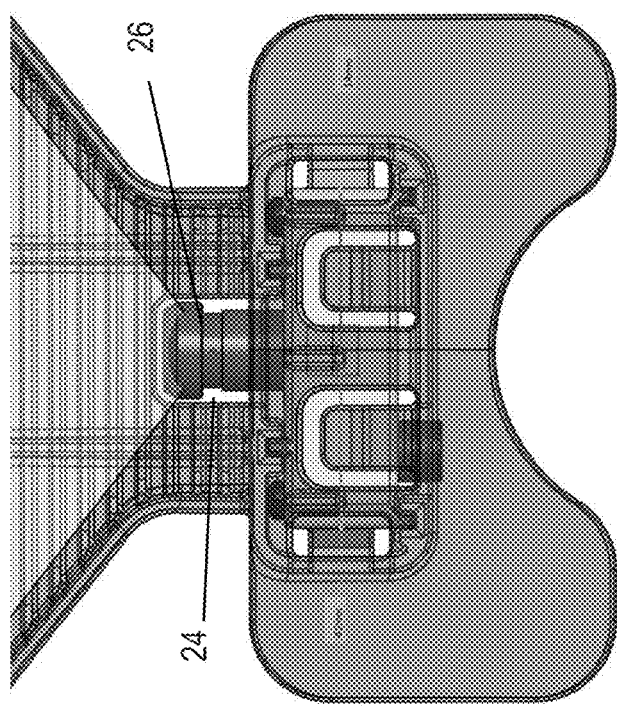
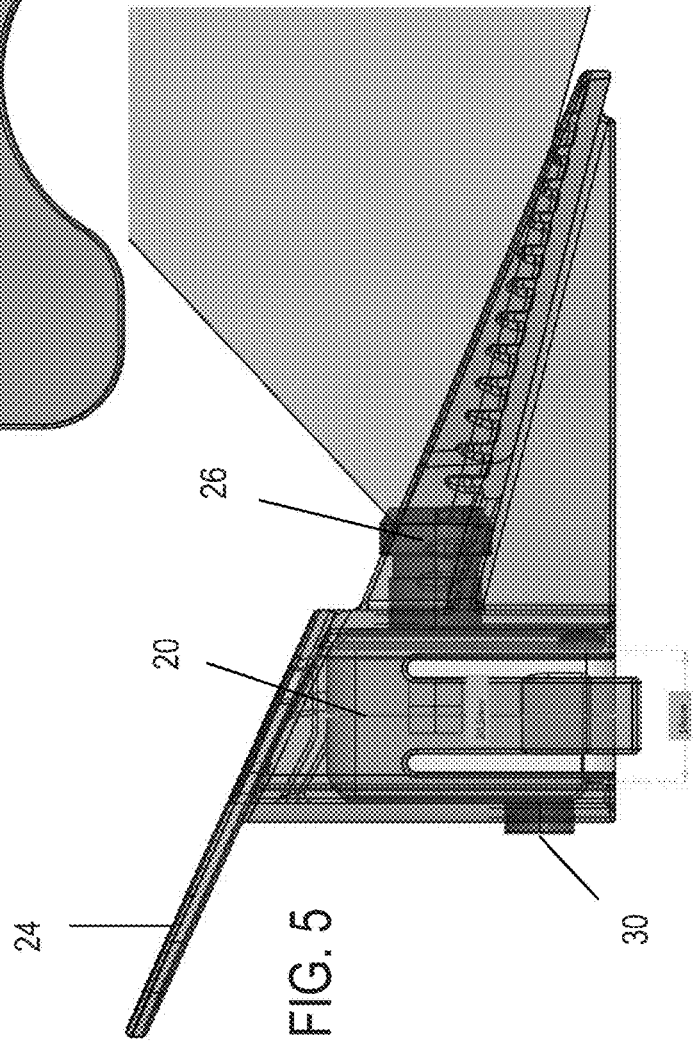

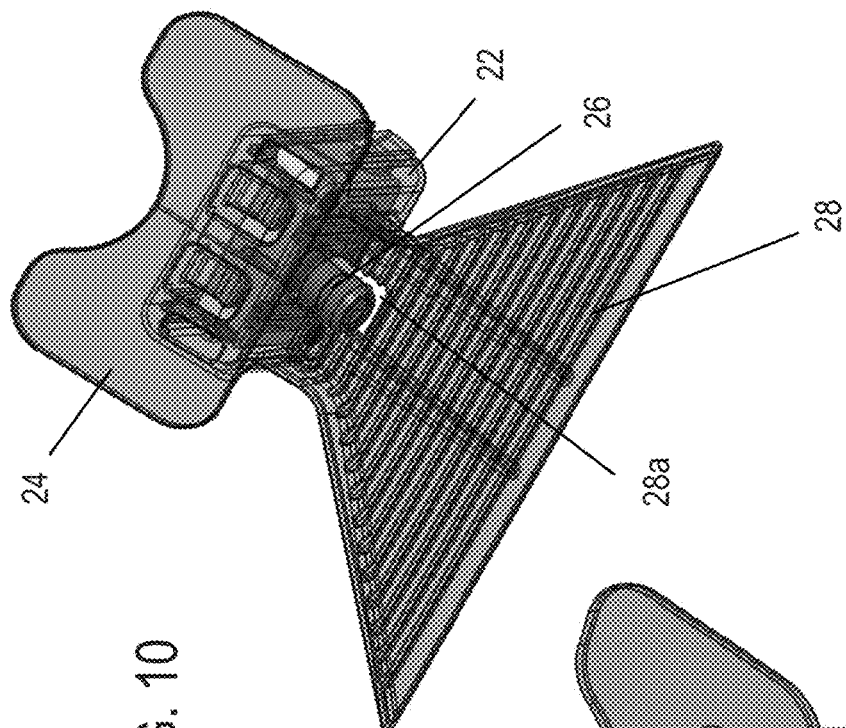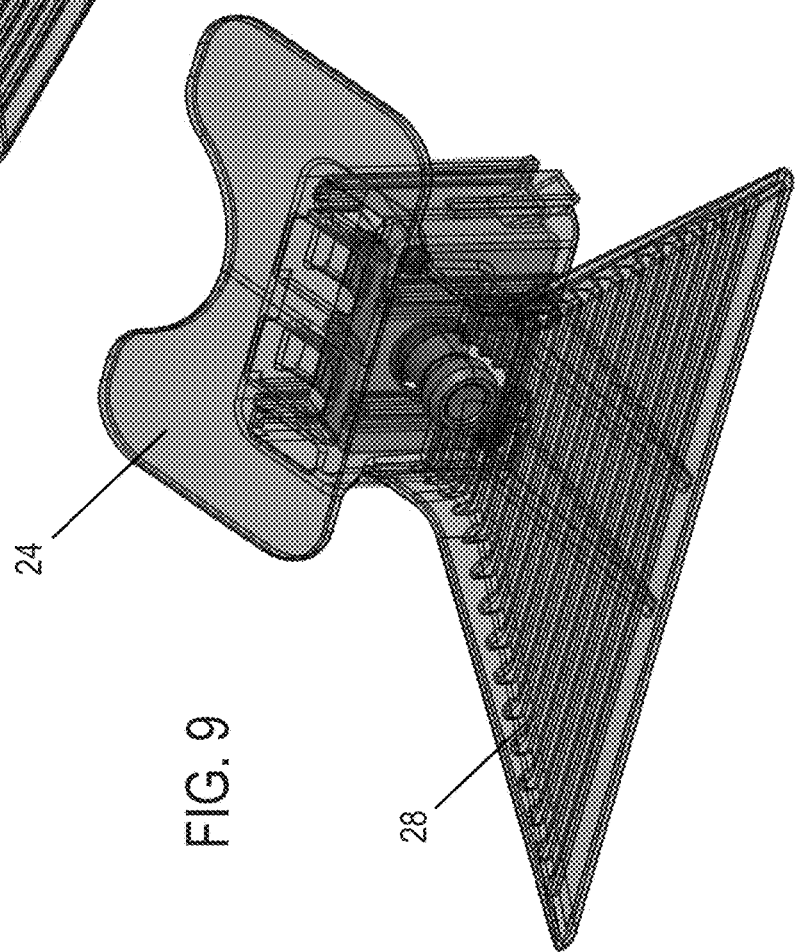

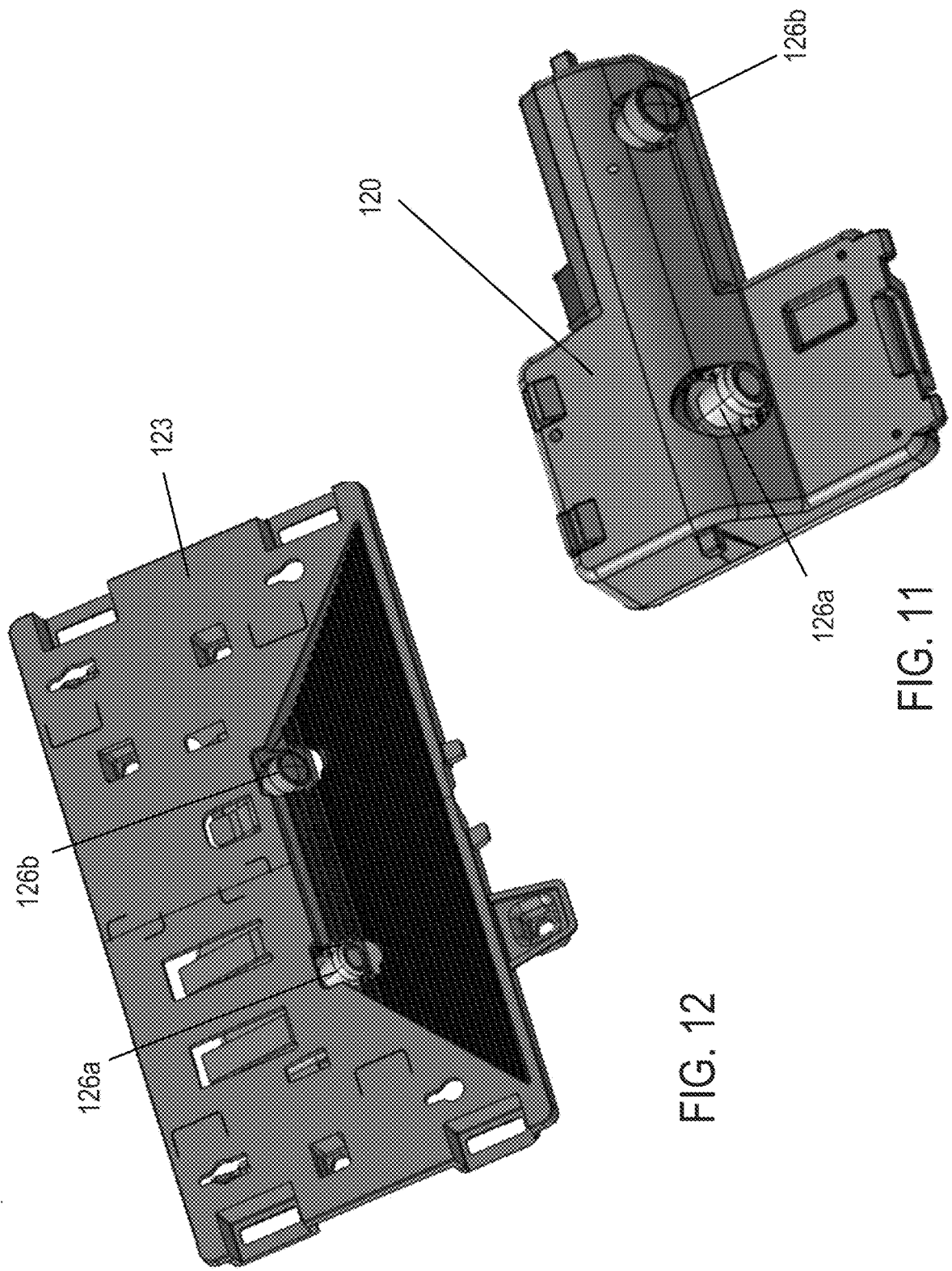

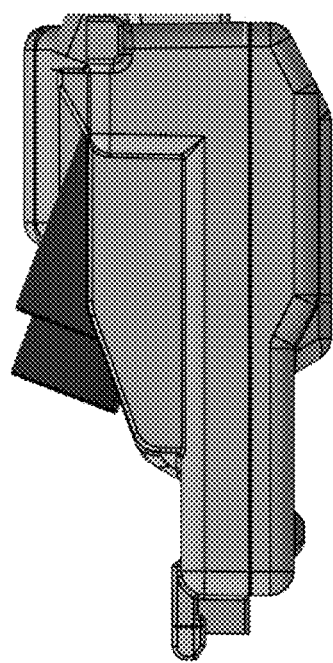
FIG. 24
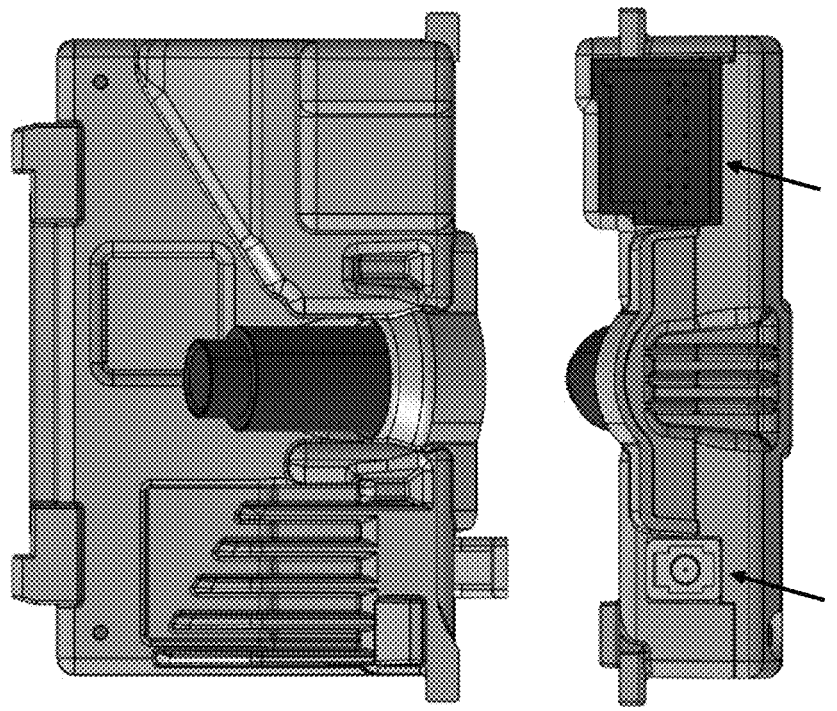
FIG. 25
FIG. 26
TE 16P MQS
miniFAKRA coax

VEHICULAR CAMERA SYSTEM WITH FORWARD VIEWING CAMERA

CROSS REFERENCE TO RELATED APPLICATIONS

The present application is a continuation of U.S. patent application Ser. No. 16/527,634, filed Jul. 31, 2019, now U.S. Pat. No. 11,124,130, which claims the filing benefits of U.S. provisional application Ser. No. 62/713,082, filed Aug. 1, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 6,824,281 and/or 6,690,268, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a windshield mounted camera module that comprises a camera unit or imager assembly having an imager that, when mounted at an in-cabin surface of a vehicle windshield, views through the windshield and forward of the vehicle. The camera module may, with an attaching structure attached at the in-cabin side of the vehicle windshield, be configured to be inserted into a camera module receiving portion of the attaching structure to attach the camera module at the vehicle windshield. With the camera module inserted into the camera module receiving portion of the attaching structure attached at the in-cabin side of the vehicle windshield, a main circuit board of the camera module is vertically oriented.

These and other objects, advantages, purposes and features of the present invention will become apparent upon review of the following specification in conjunction with the drawings.

BRIEF DESCRIPTION OF THE DRAWINGS

FIG. 5 is a side elevation and partial sectional view of the camera of FIG. 2;

FIG. 6 is an enlarged top plan view of the camera of FIG. 2;

FIGS. 9 and 10 are upper perspective views of the camera of FIG. 2;

FIGS. 11 and 12 are perspective views of another camera module for mounting at a vehicle windshield, with the camera having two imagers and lenses viewing forward through the vehicle windshield;

FIG. 24 is a side elevation of the camera of FIG. 19;

FIG. 25 is a top plan view of the camera of FIG. 19;

FIG. 26 is a rear elevation of the camera of FIG. 19;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
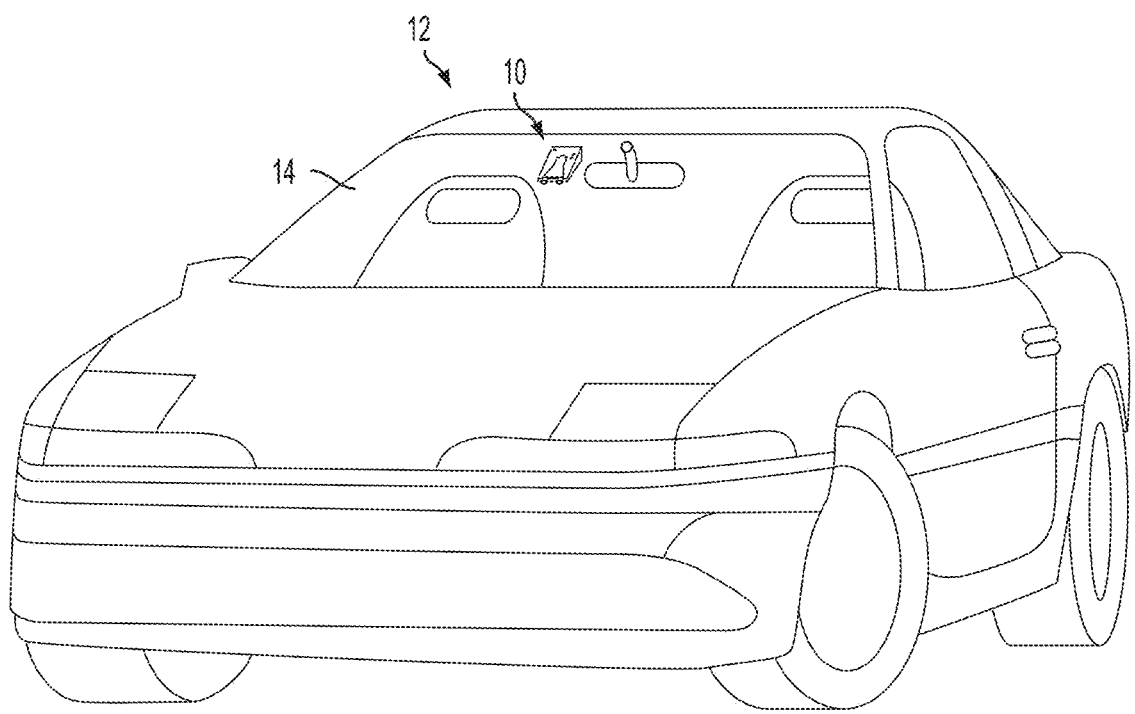
FIG. 1 is a plan view of a vehicle with a vision system that incorporates cameras in accordance with the present invention.

Referring now to the drawings and the illustrative embodiments depicted therein, vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Referring now to FIGS. 2-10, the camera module 20 comprises a housing that houses an imager disposed at an imager printed circuit board. The camera module 20 has a lens that images at the imager, and the camera module houses a primary or processor printed circuit board, with circuitry of the imager circuit board electrically connected to circuitry of the primary or processor circuit board. The camera housing or module is received in or disposed at a bracket or support structure 22 that attaches at an attaching structure 24 that attaches at the in-cabin surface of the vehicle windshield. When the bracket 22 is attached at the attaching structure 24 at the windshield, the camera module is oriented with the imager circuit board and the processor circuit board being generally vertically oriented, and with the camera lens 26 (and imager at the circuit board) viewing forwardly through the windshield via a light trap or shield 28 (and having a field of view that spans up to or over 100 degrees). The circuitry of the imager circuit board is electrically connected to the circuitry of the processor circuit board, such as via a flexible electrical connector or ribbon cable or the like. Optionally, the camera module may comprise a single printed circuit board, with the imager disposed at one side and a connector disposed at the other side and associated circuitry disposed at either or both sides of the circuit board. The rear of the camera module has an electrical connector 30 (such as a coaxial connector) for electrically connecting circuitry of the camera (such as via a header connector at a rear side of the processor circuit board that is opposite the front side that faces the imager circuit board) with a wire harness of the vehicle. The camera module is electrically connected to an ECU that is remote from or not part of the camera module, and that has a processor for processing image data captured by the camera.

The camera module is configured to attach at the attaching structure or bracket when the bracket is attached at a windshield of a vehicle. The bracket 24 includes a windshield attaching portion (that may be bonded to the in-cabin surface of the windshield or that may attach at buttons or elements that are bonded to the in-cabin surface of the windshield) and the camera receiving structure 22 and the stray light shield 28. When attached at the windshield, the receiving structure 22 extends generally vertically (such as within five or ten percent of vertical when the structure is attached at the windshield and the vehicle is located on a horizontal support surface or ground) and downward from the attaching structure and from the windshield and has an open lower end 22a that is configured for receiving the camera module therein (with the walls of the receiving structure being generally vertically oriented when the structure is attached at the vehicle windshield and with the walls of the receiving structure defining or circumscribing and forming a recess or pocket or receiving portion that is configured to receive the camera module therein).

Figure 2:
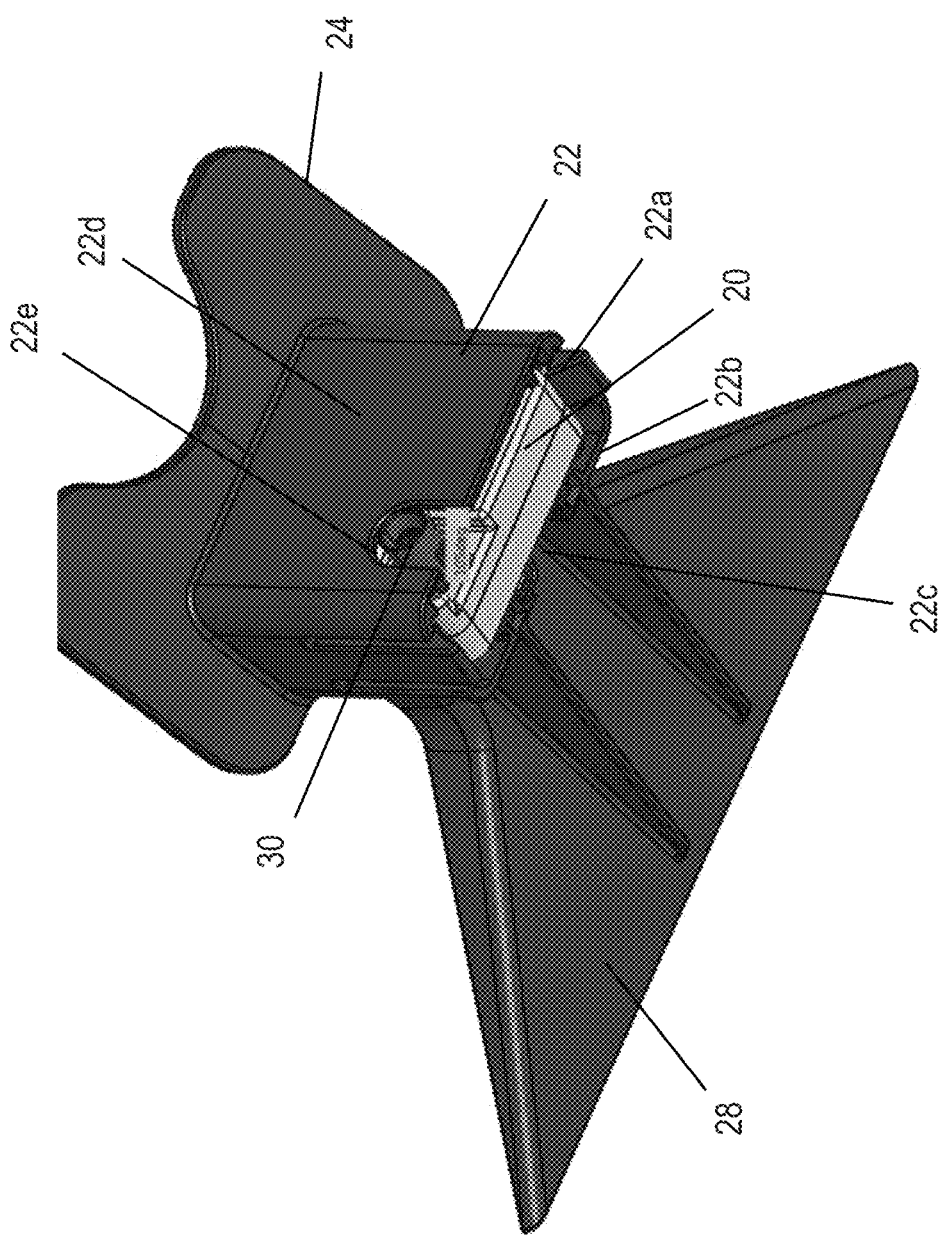
FIG. 2 is a lower perspective view of a camera configured for mounting at a vehicle windshield, with the imager circuit board of the camera generally vertically oriented when the camera is mounted at the vehicle windshield.
Figure 4:
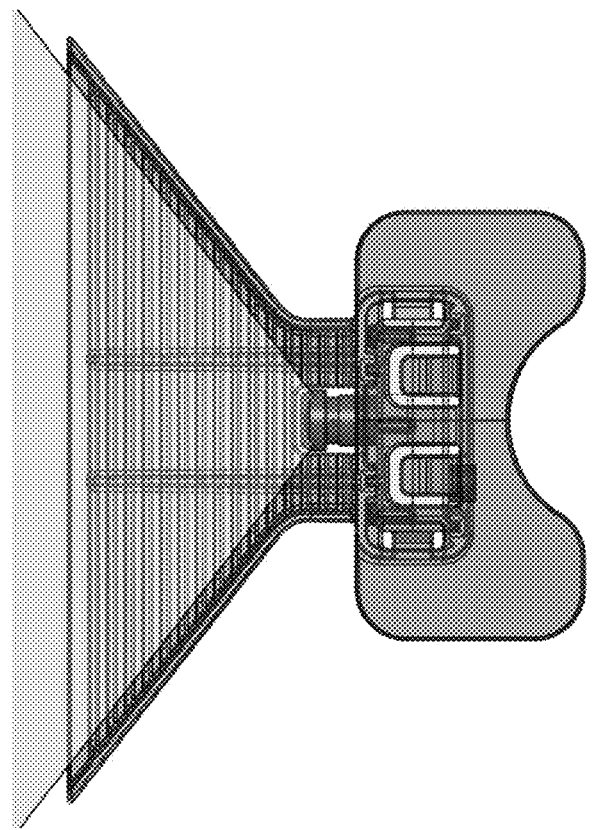
FIG. 4 is a top plan view of the camera of FIG. 2, shown with a transparent bracket.
Figure 3:
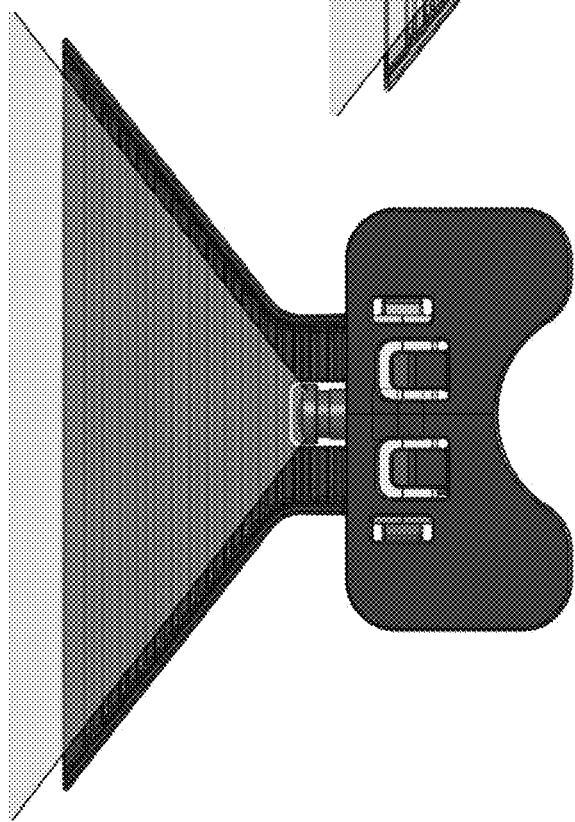
FIG. 3 is a top plan view of the camera of FIG. 2, shown with a solid (non-transparent) bracket.
Figure 8:
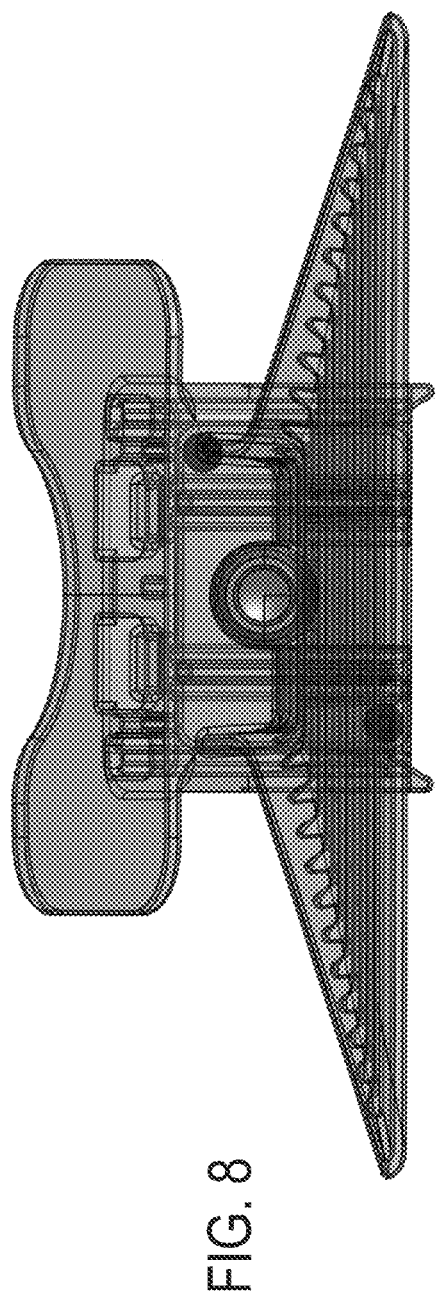
FIG. 8 is a front elevation of the camera of FIG. 2.
Figure 7:
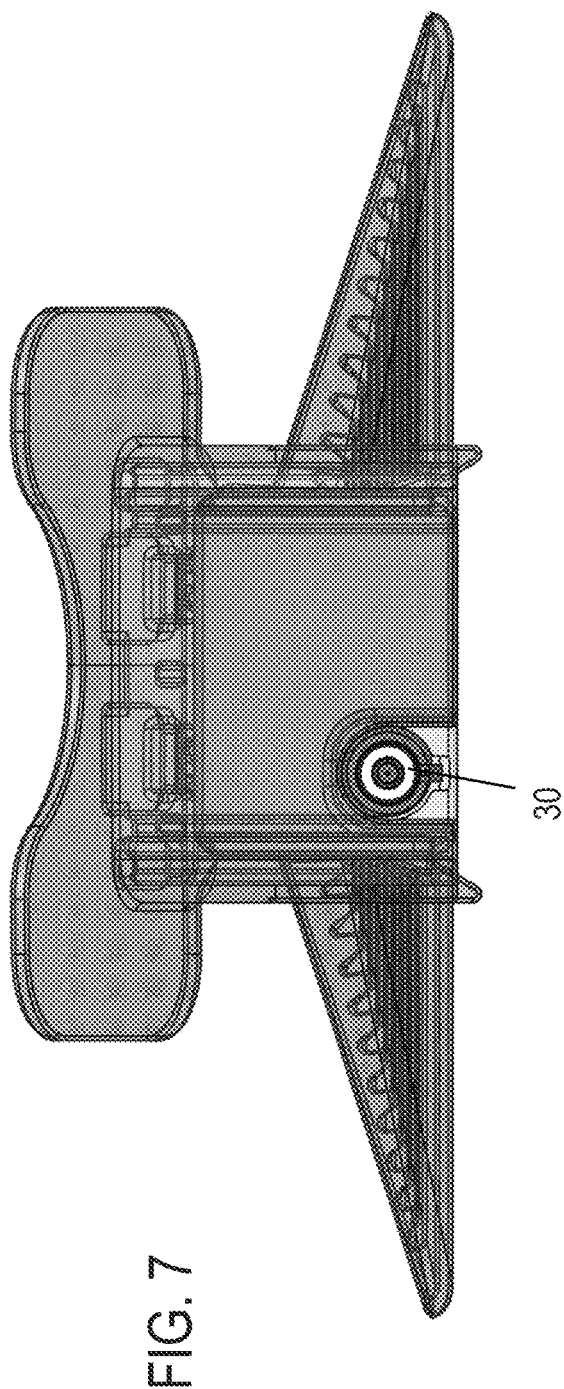
FIG. 7 is a rear elevation of the camera of FIG. 2.

In the illustrated embodiment, and as best shown in FIG. 2, the camera module may be inserted upward and into the receiving structure and may be fastened at the receiving structure or snap-attached therein (such as via flexible tabs at the receiving structure engaging corresponding tabs or surfaces at the lower region of the camera module to limit downward movement of the camera module after it is fully inserted or seated and retained in the receiving structure). The receiving structure 22 includes a slot or notch 22c at its forward side 22b to allow for the lens 26 of the camera module to move upward along the notch as the camera module is inserted into the receiving structure. Likewise, the receiving structure includes a slot or notch 22e at its rearward side 22d to allow for the electrical connector 30 of the camera module to move upward along the notch as the camera module is inserted into the receiving structure. Thus, the camera housing is disposed within the receiving portion (and may be snapped or fastened therein), while the camera lens protrudes from the front side or wall of the receiving portion and the electrical connector protrudes from the rear side or wall of the receiving portion.

The camera module comprises a low profile module that is less than 35 mm in height (e.g., about 30.5 mm) and is less than 20 mm in depth (e.g., about 14 mm) and is less than 45 mm in width (e.g., about 42 mm). The receiving structure 22 and stray light shield 28 may be formed together or may be attached or joined together, whereby the structure 22 may snap attach or otherwise be secured to the attaching structure 24 at the windshield. The camera module 20 may be readily inserted into the structure 22, whereby the lens of the camera module is received along the notch or slot 22c and through an aperture or slot at the light shield as the module is pressed upward, until the lens is disposed at and viewing through a pocket defined by the light shield and windshield. As shown in FIGS. 6 and 10, the light shield 28 includes a notch or opening 28a that allows for upward movement of the lens 26 through the light shield as the camera is inserted into the receiving structure from below the receiving structure and light shield. The electrical connector may also be received in and along the slot at the rear 22e of the structure as the camera module is pressed or inserted into the support structure at the windshield. For service, the camera module may be readily removed and serviced or replaced, without having to remove the support structure and light shield.

Figure 13:
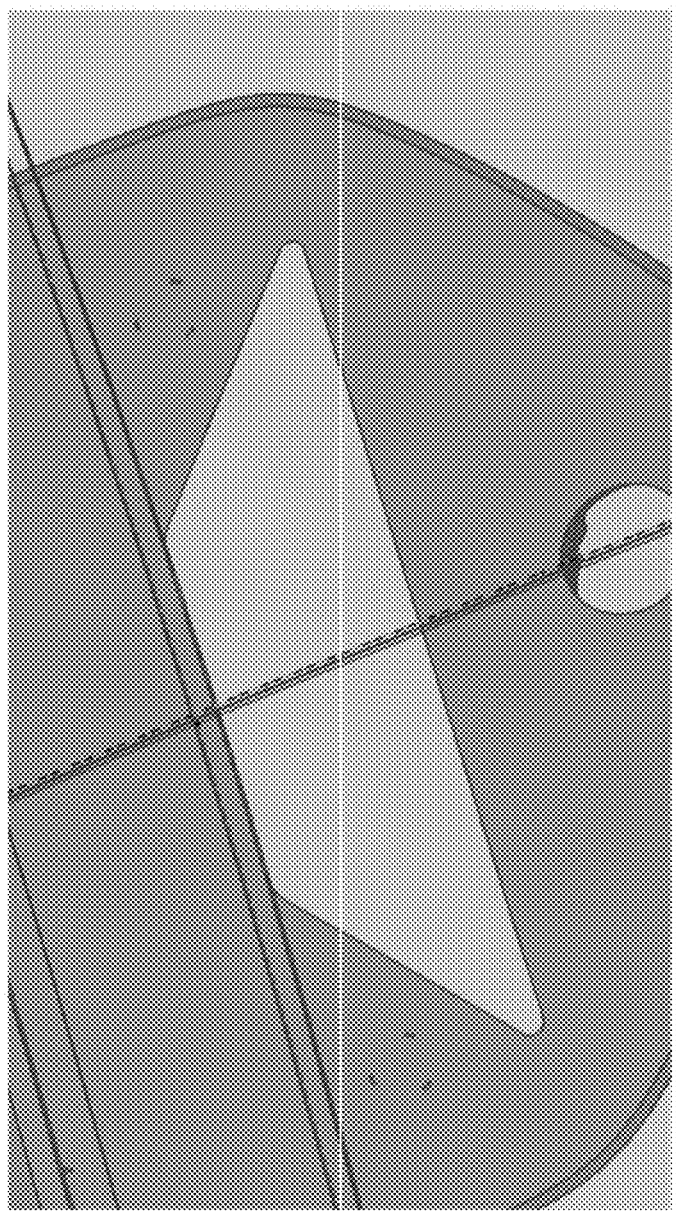
FIG. 13 is a view of a light transmitting aperture established at a non-light transmitting region of the vehicle windshield, whereby the imagers and lenses of the camera module of FIGS. 11 and 12 view through the aperture.
Figure 15:
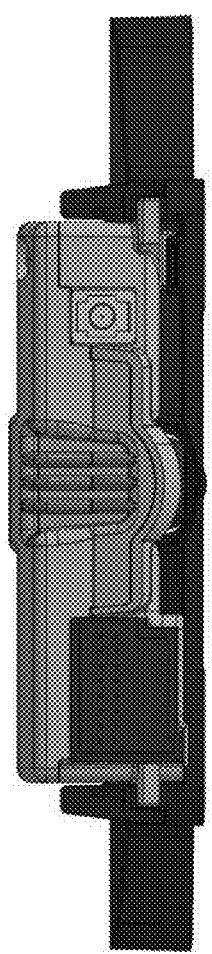
FIG. 15 is a rear elevation of the camera of FIG. 14.
Figure 14:
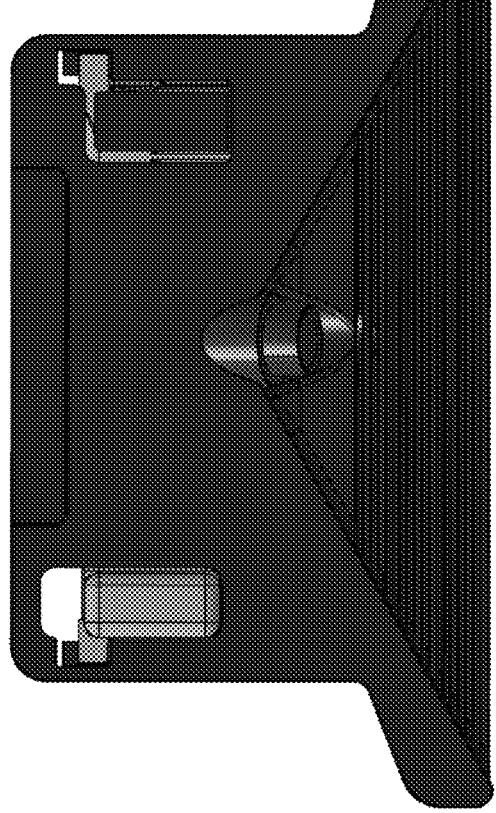
FIG. 14 is a top plan view of another camera module for mounting at a vehicle windshield, with the camera having a width of less than 100 mm, a depth of less than 65 mm and a maximum height of less than 35 mm.
Figure 16:
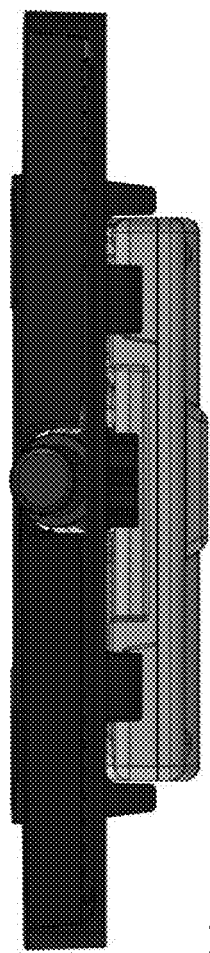
FIG. 16 is a front elevation of the camera of FIG. 14.

Optionally, and with reference to FIGS. 11 and 12, a camera module 120 may attach at a mounting structure or attaching structure 123 at the vehicle windshield, and may include two (or more) imagers and lenses 126a, 126b. The camera module may provide stereo imaging capabilities (where both cameras (imagers and lenses) function in a similar manner), or each camera may function differently. For example, one of the cameras may capture color video image data during daytime lighting conditions and the other camera may capture infrared or near-infrared video image data during nighttime lighting conditions, so that the camera provides enhanced night vision and enhanced daytime vision (such as by utilizing aspects of the camera systems described in U.S. Publication Nos. US-2017-0113613 and/or US-2016-0119527, which are hereby incorporated herein by reference in their entireties). Optionally, one of the cameras may comprise a higher resolution or HD camera and the other camera may comprise a lower resolution camera or even a thermal imaging camera or the like. The cameras both view through a common light transmitting aperture formed or established at a non-light transmitting region of the vehicle windshield (see FIG. 13).

Figure 18:
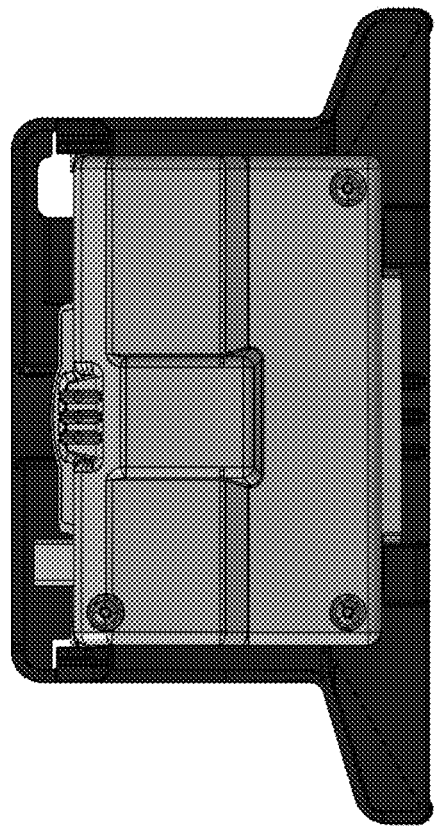
FIG. 18 is a side elevation of the camera of FIG. 14.
Figure 17:
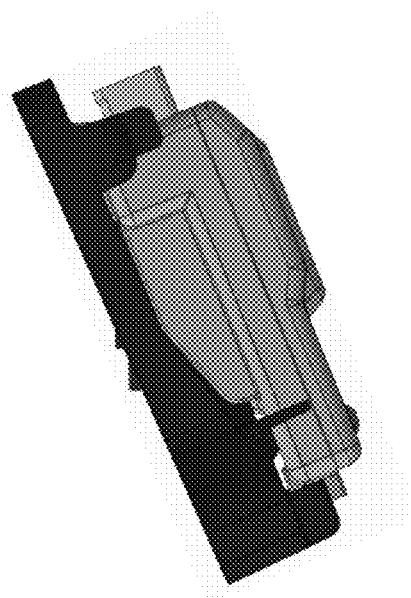
FIG. 17 is a lower plan view of the camera of FIG. 14.
Figure 20:
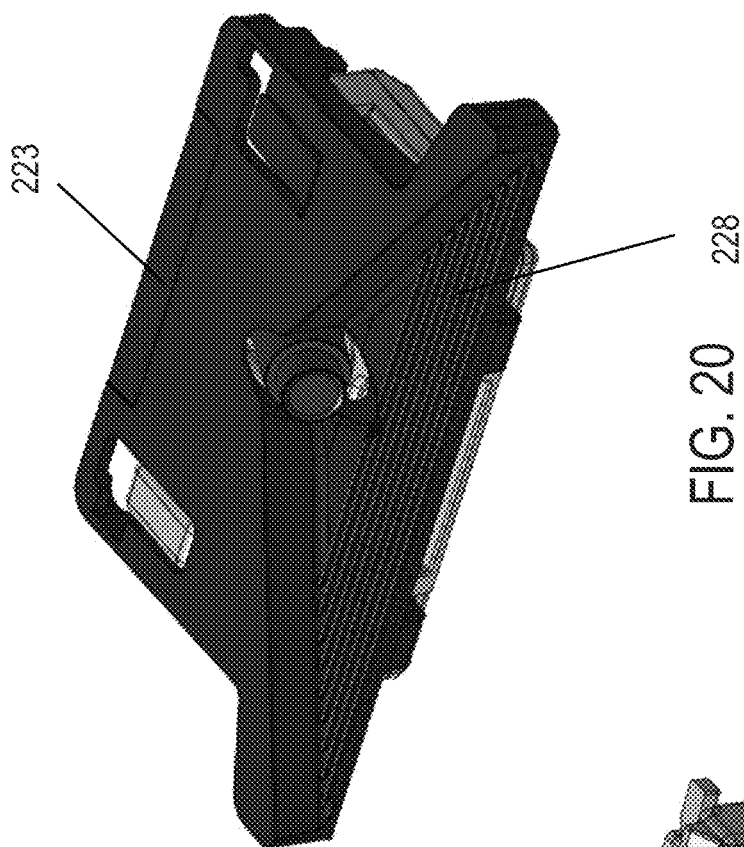
FIG. 20 is an upper perspective view of the camera of FIG. 14, shown with the light shield.
Figure 19:
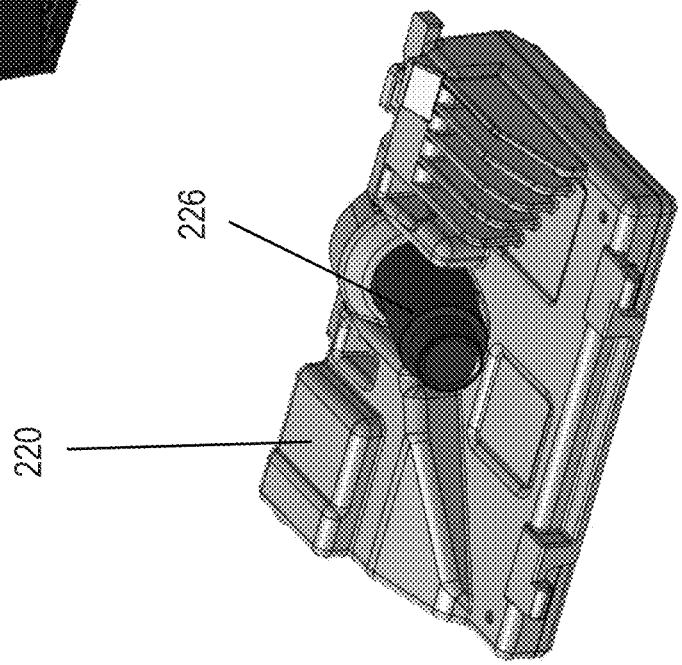
FIG. 19 is an upper perspective view of the camera of FIG. 14, shown with the light shield removed.
Figure 21:
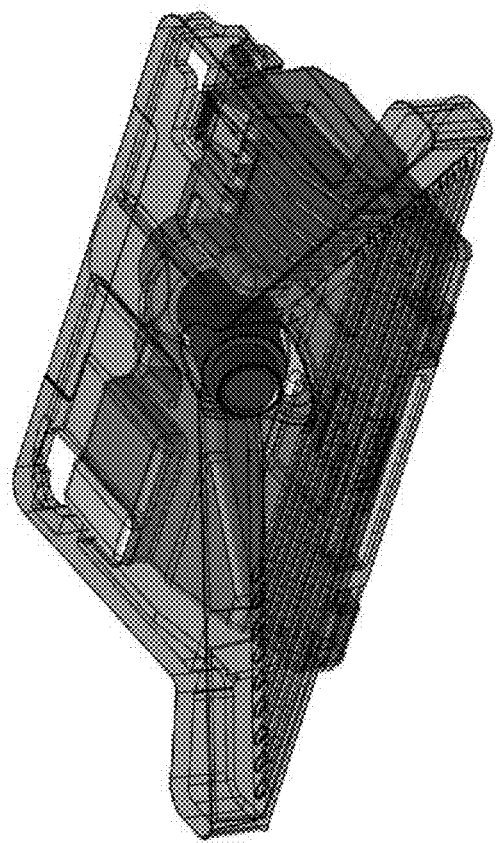
FIG. 21 is an upper perspective view of the camera of FIG. 14, shown with the light shield in phantom.
Figure 22:
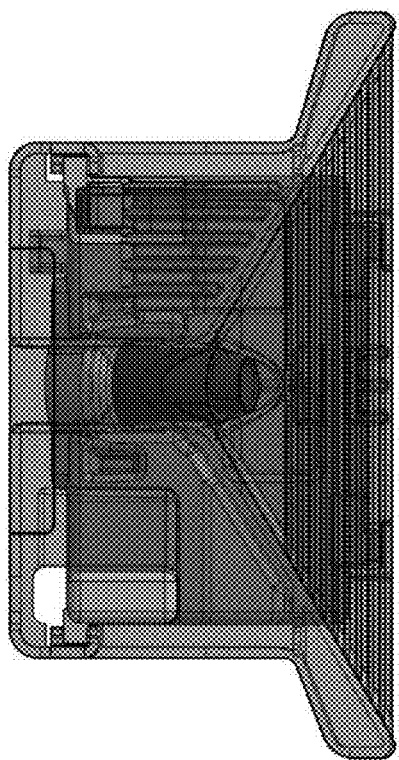
FIG. 22 is a top plan view of the camera of FIG. 21.
Figure 23:
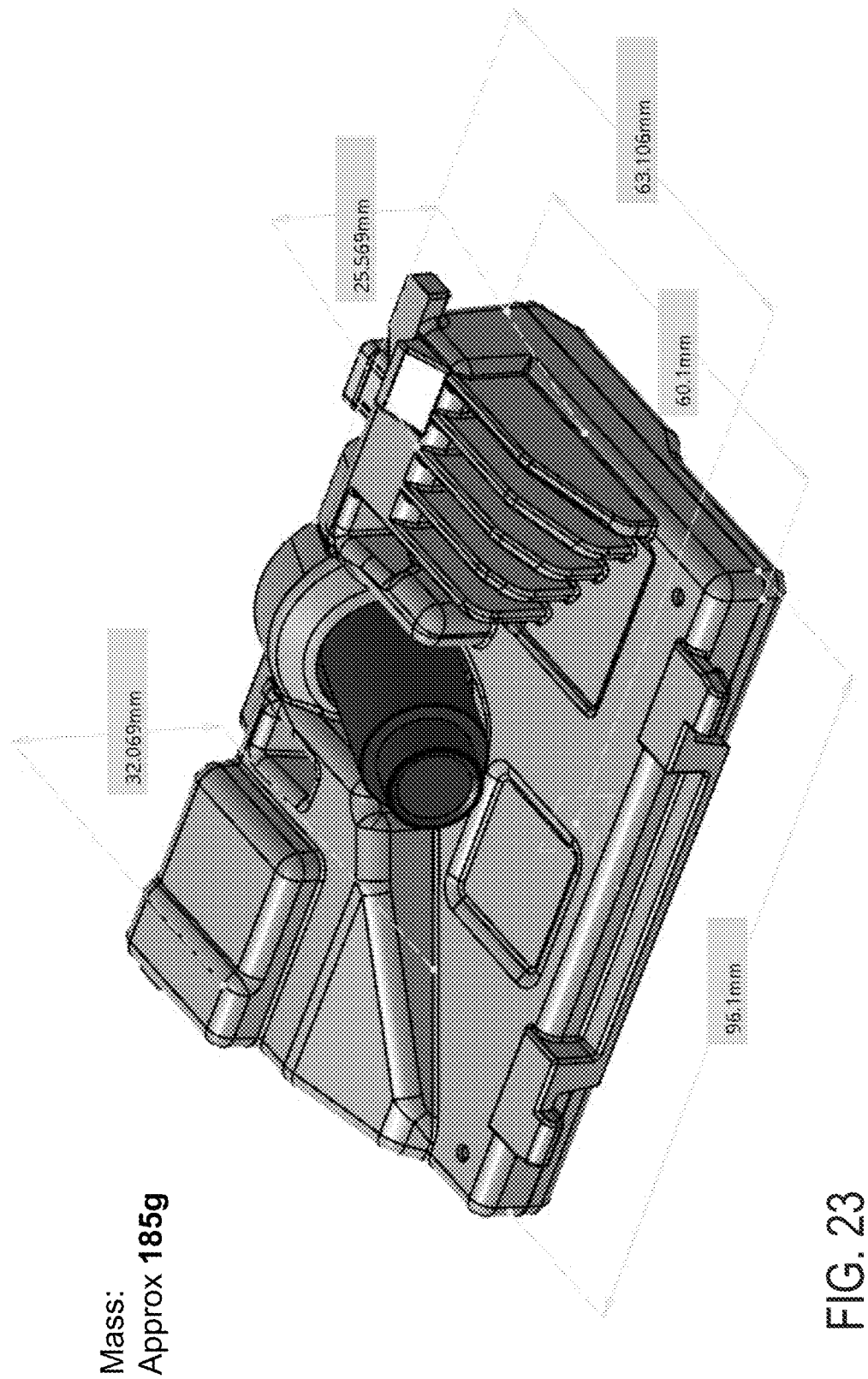
FIG. 23 is an enlarged upper perspective view of the camera of FIG. 19.
Figure 28:
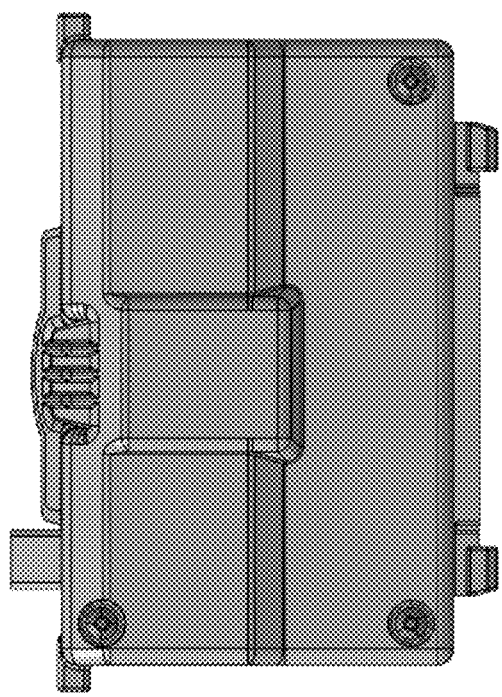
FIG. 28 is a bottom plan view of the camera of FIG. 19.
Figure 27:
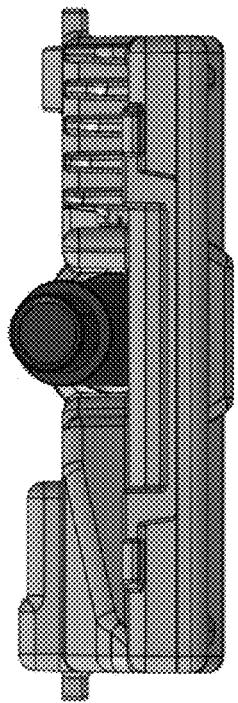
FIG. 27 is a front elevation of the camera of FIG. 19.

Optionally, and with reference to FIGS. 14-31, another camera module 220 (that includes an imager and lens and circuitry including a processor and other control/processing circuitry) is attached at a support structure 223, which is configured to attach at the in-cabin surface of the vehicle windshield and which includes a light shield. The camera module 220 comprises a low profile "landscape style" camera module having a width of less than 100 mm (e.g., about 96 mm), a depth of less than 65 mm (e.g., about 63 mm), and a maximum height of less than 35 mm (e.g., about 32 mm). As can be seen in FIG. 18, the width of the camera module is much greater than the depth or length of the camera module. As shown in FIG. 23, the camera module includes heat dissipating fins at one side of the lens 226 to dissipate heat generated by the camera during operation (such as heat generated by the data processor in the camera during processing of image data captured by the imager or camera unit or imager assembly).

Figure 29:
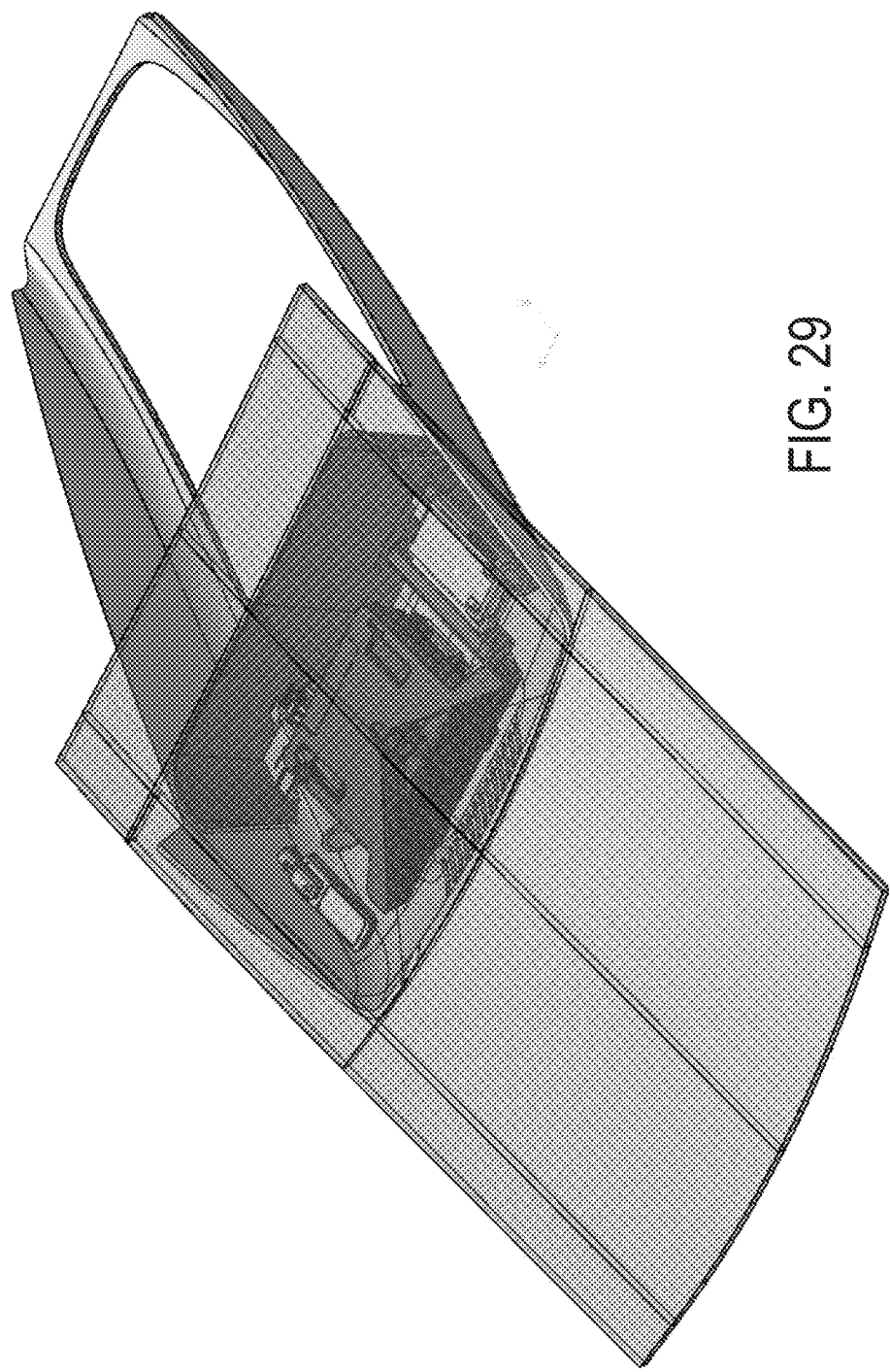
FIG. 29 is an upper perspective view of the camera of FIG. 14, shown mounted at a windshield of a vehicle, and within a housing at the windshield.
Figure 31:
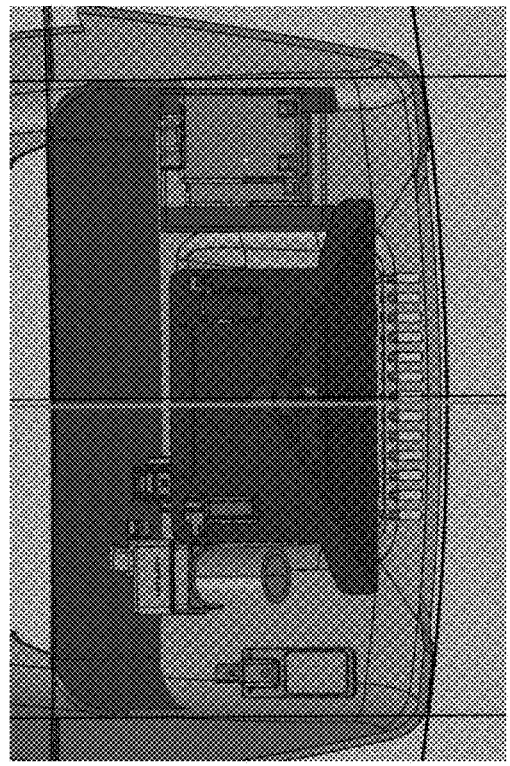
FIG. 31 is a top plan view of the camera and housing of FIG. 29.
Figure 30:
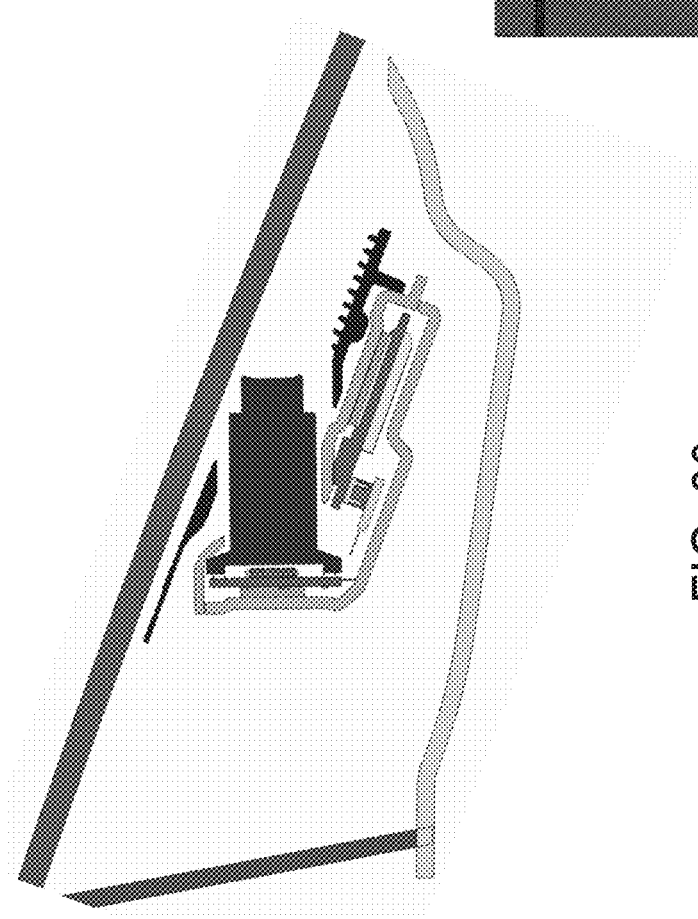
FIG. 30 is a side sectional view of the camera and housing of FIG. 29.
Figure 32:
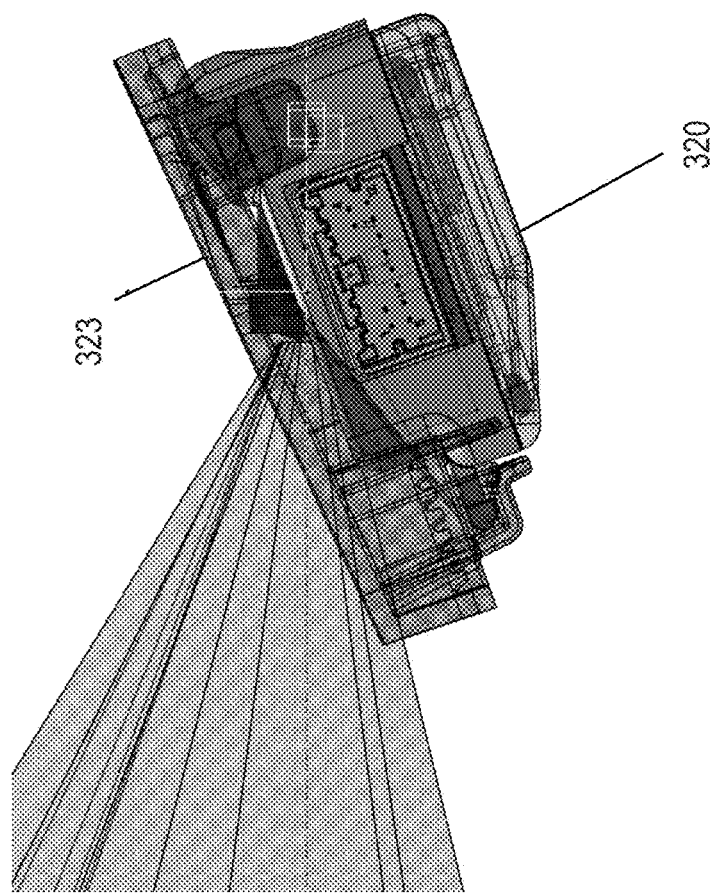
FIG. 32 is a side elevation and partial sectional view of another camera module for mounting at a vehicle windshield.
Figure 33:
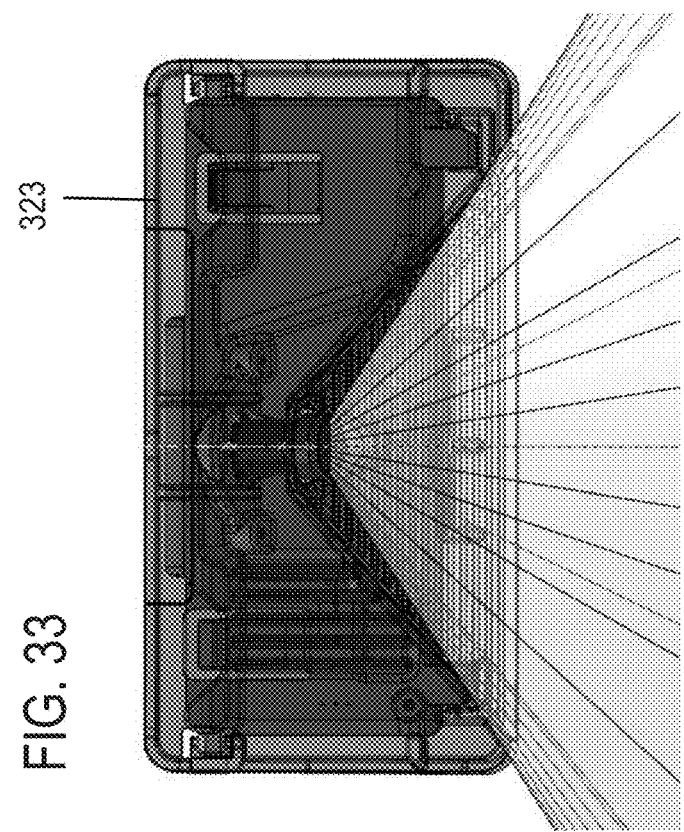
FIG. 33 is a top plan view of the camera of FIG. 32.
Figure 35:
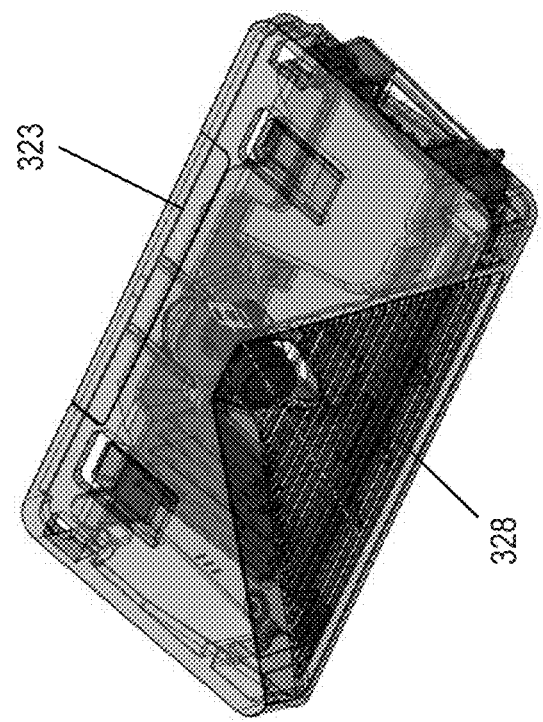
FIGS. 34 and 35 are upper perspective views of the camera of FIG. 32.
Figure 34:
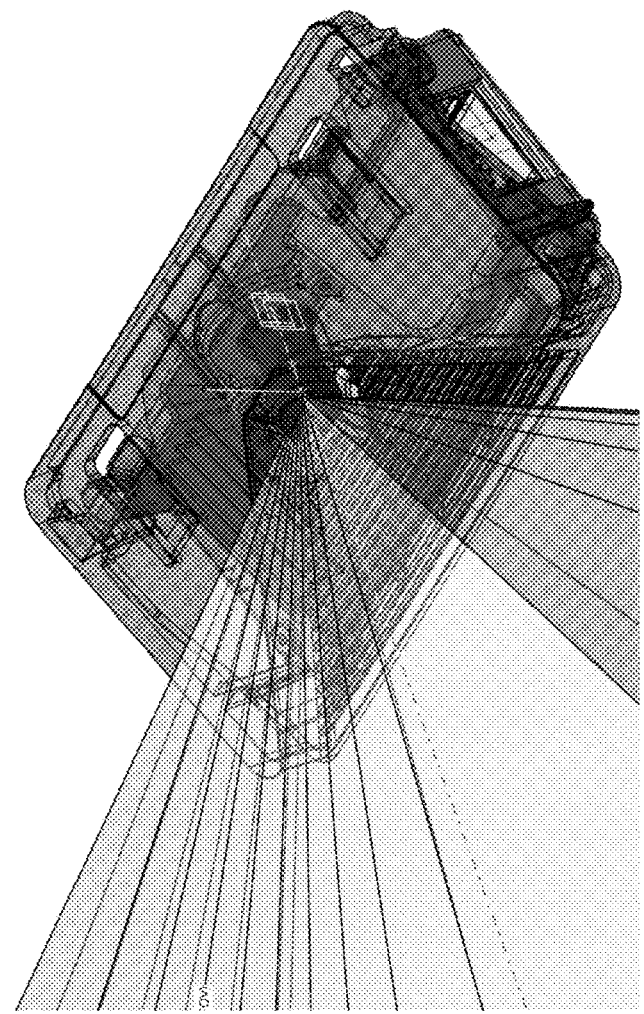
Figure 36:
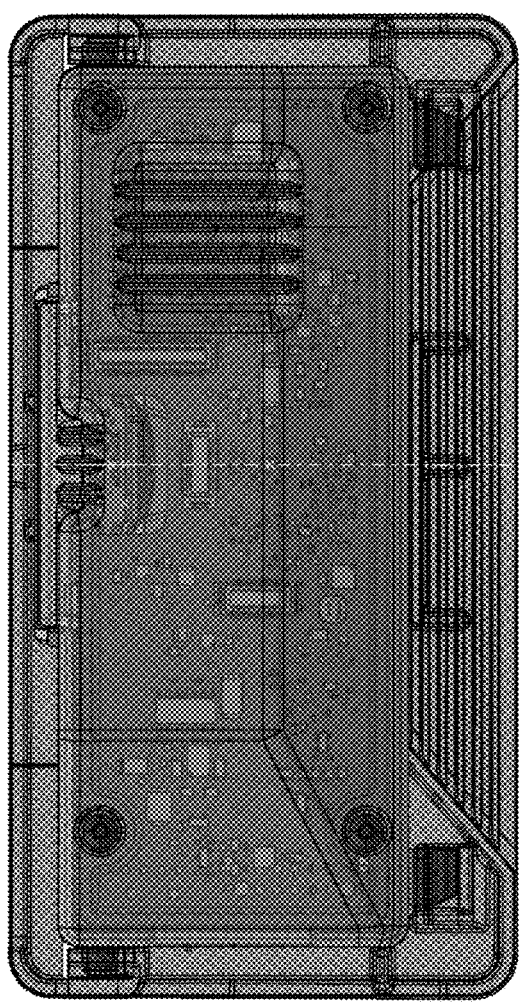
FIG. 36 is a lower plan view of the camera of FIG. 32.
Figure 37:
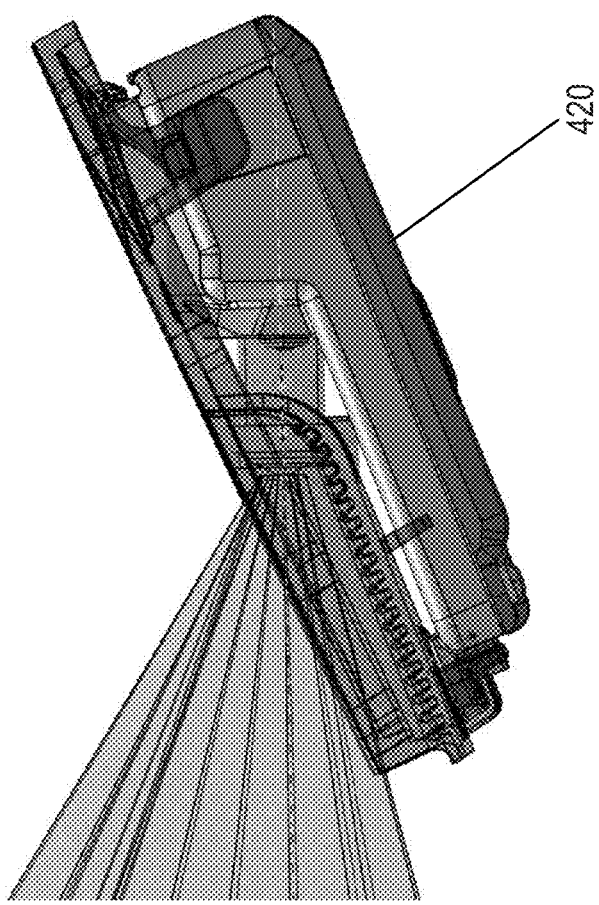
FIG. 37 is a side elevation and partial sectional view of another camera for mounting at a vehicle windshield.
Figure 38:
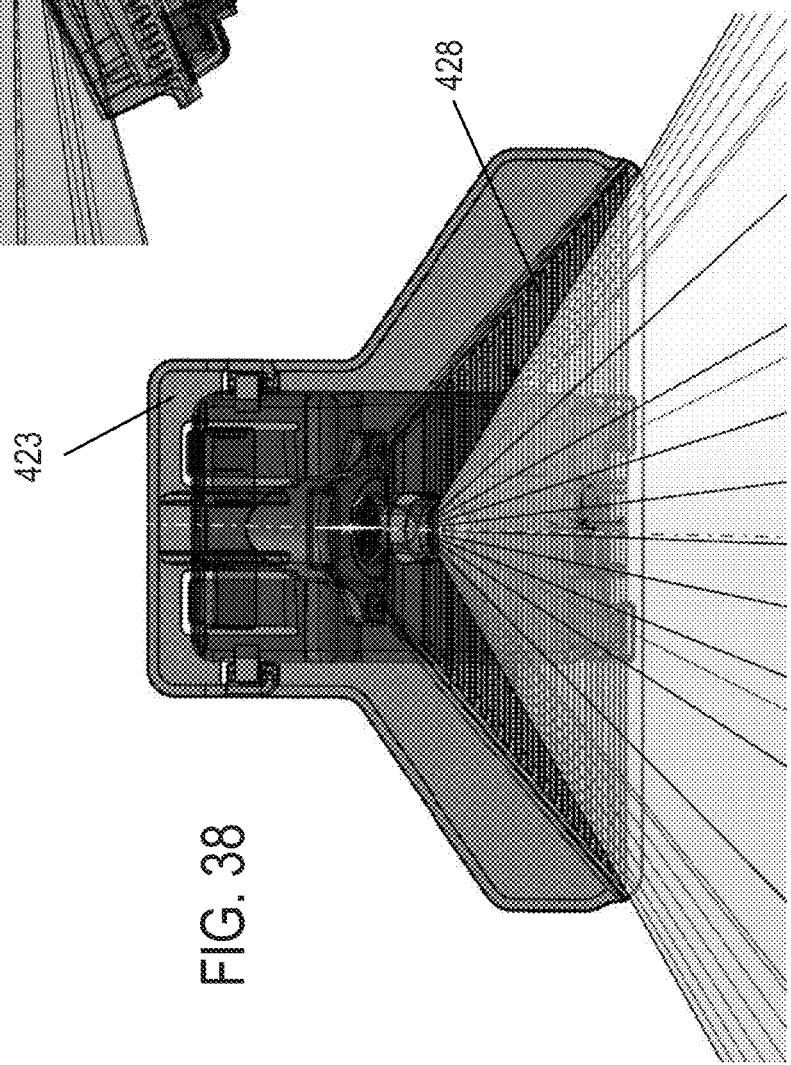
FIG. 38 is a top plan view of the camera of FIG. 37.
Figure 39:
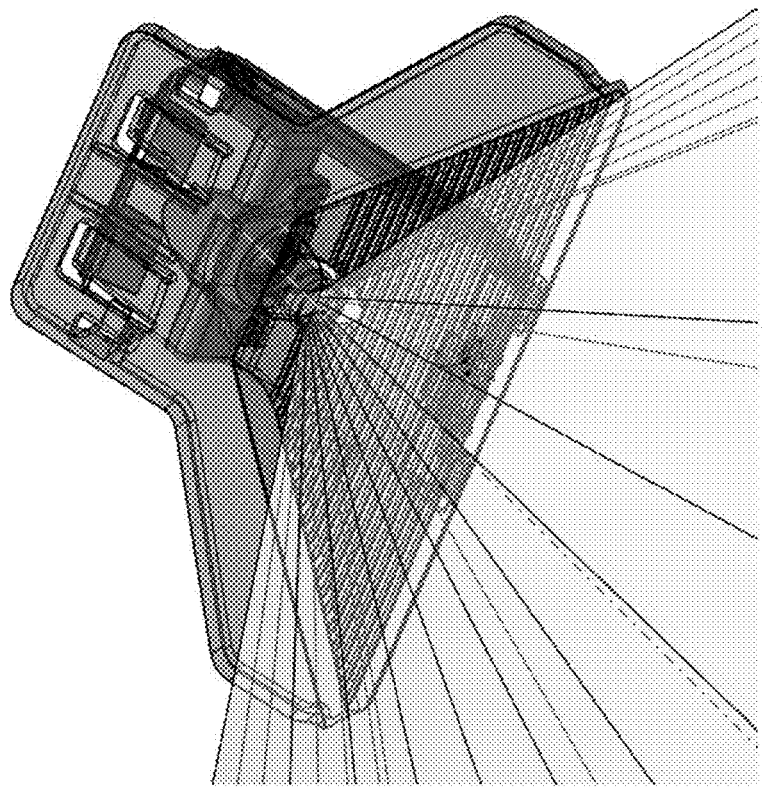
FIG. 39 is an upper perspective view of the camera of FIG. 37.
Figure 40:
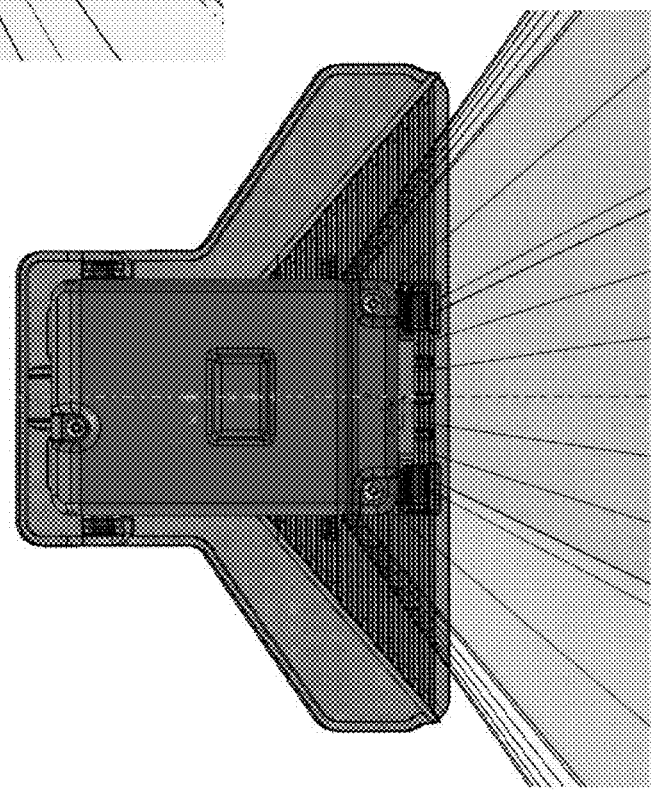
FIG. 40 is a bottom plan view of the camera of FIG. 37.
Figures 41, 42:
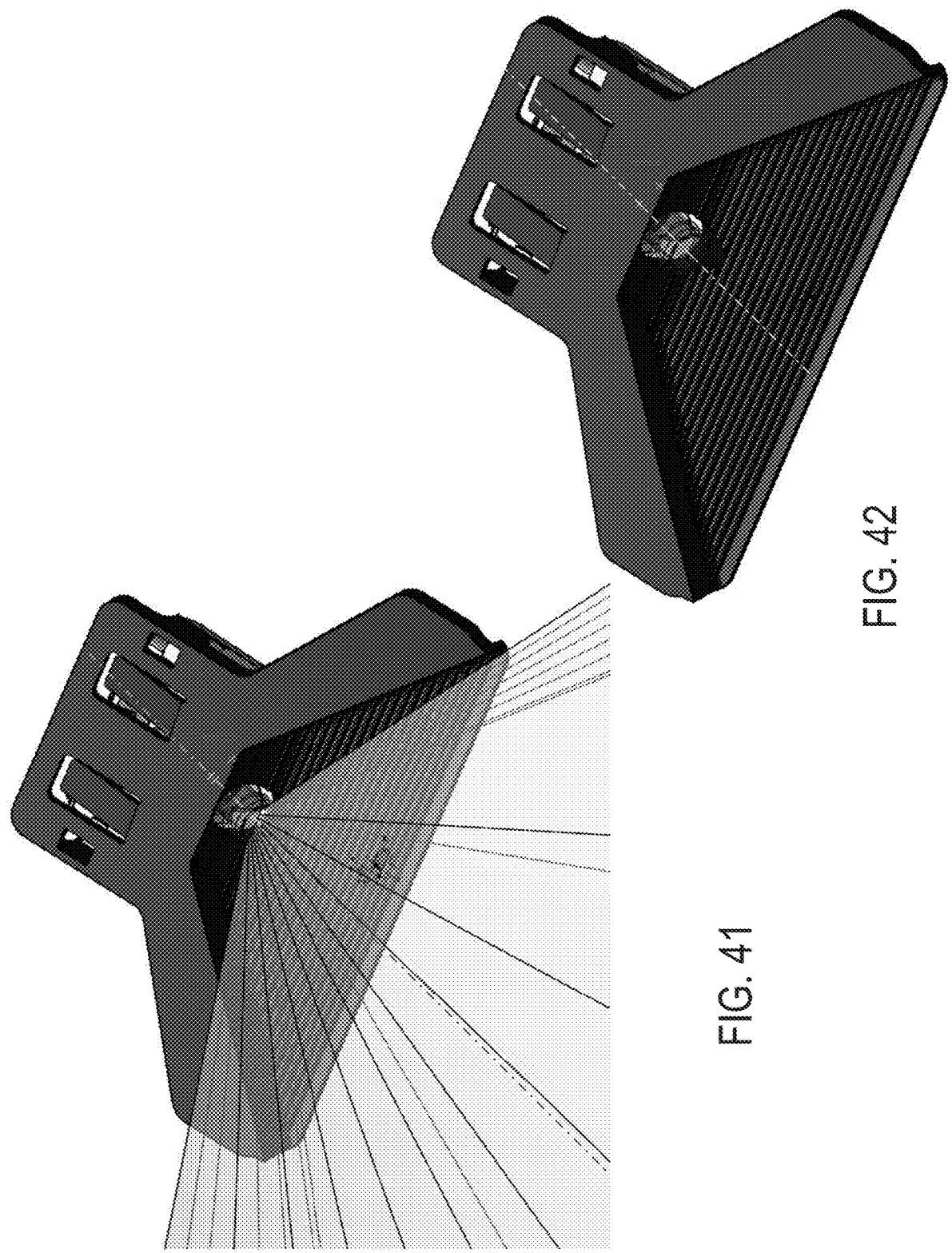
FIGS. 41 and 42 are upper perspective views of the camera of FIG. 37 as disposed at the mounting bracket and stray light shield.

The camera module may snap attach at the support structure (which may attach at fixing elements attached at the vehicle windshield) or may be fastened thereto via a plurality of fasteners. In the illustrated embodiment, the camera module includes tabs at the front of the module that slide into receptacles at the bracket or support structure, whereby the camera is rotated up so that tabs at the rear of the camera module swing up and into receptacles at the bracket or support structure and snap into the receptacles to retain the camera module at the bracket or support structure. When the camera module is attached at the support structure, the lens 226 views forward through the windshield via a pocket defined by the stray light shield 228 and the windshield. As shown in FIG. 26, the camera module may have a coaxial connector and a multi-pin connector to electrically connect the camera module to one or more wire harnesses of the vehicle. FIGS. 29-31 show the camera module as disposed at the vehicle windshield, along with other components of the accessory module or system disposed at the vehicle windshield.

Optionally, and with reference to FIGS. 32-36, another camera module 320 is disposed at a structure 323 that is configured to attach at the in-cabin surface of the vehicle windshield. The camera module 320 is disposed at the structure 323 such that the lens views forward through the windshield via a pocket formed by the stray light shield 328 and the windshield, with the lens having a wide angle field of view at least 100 degrees or more. The stray light shield may be part of the camera module housing. The camera module 320 comprises a "landscape style" module, where the width of the camera module is greater than the length or depth of the camera module. The camera module may attach to the attaching structure or bracket in a similar manner as described above.

Optionally, and with reference to FIGS. 37-42, another camera module 420 is disposed at a structure 423 that is configured to attach at the in-cabin surface of the vehicle windshield. The camera module 420 is disposed at the structure 423 such that the lens views forward through the windshield via a pocket formed by the stray light shield 428 and the windshield, with the lens having a wide angle field of view at least 100 degrees or more. The camera module 420 comprises a "portrait style" module, where the length of the camera module is greater than the width of the camera module. The camera module may attach to the attaching structure or bracket in a similar manner as described above.

Each of the cameras thus comprises a forward viewing camera or camera module disposed at and behind the windshield of a vehicle, such as disposed at a windshield electronics module (WEM) or at a mounting bracket or the like attached at the windshield. The forward viewing camera or camera module may utilize aspects of the systems described in U.S. Pat. Nos. 9,896,039; 9,871,971; 9,596,387; 9,487,159; 9,451,138; 9,380,219; 8,256,821; 7,480,149; 6,824,281 and/or 6,690,268, and/or U.S. Publication No. US-2016-0264063, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera system, said vehicular camera system comprising:
an attaching structure configured to attach at an in-cabin side of a vehicle windshield of a vehicle;
a camera module accommodating a circuit board and an imager, wherein said camera module comprises a lens that is aligned with said imager;
wherein said attaching structure comprises a camera module receiving portion dimensioned to receive said camera module at least partially therein;
wherein said camera module receiving portion comprises an opening, and wherein, with said attaching structure attached at the in-cabin side of the vehicle windshield, said opening is at a lower portion of said camera module receiving portion;
wherein, with said attaching structure attached at the in-cabin side of the vehicle windshield, said camera module is inserted upward through said opening and is at least partially received in said camera module receiving portion of said attaching structure to attach said camera module at said camera module receiving portion of said attaching structure attached at the in-cabin side of the vehicle windshield; and
wherein, with said attaching structure attached at the in-cabin side of the vehicle windshield and with said camera module at least partially received in said camera module receiving portion of said attaching structure attached at the in-cabin side of the vehicle windshield, said imager views through the vehicle windshield and forward of the vehicle.

2. The vehicular camera system of claim 1, wherein, with said attaching structure attached at the in-cabin side of the vehicle windshield and with said camera module at least partially received in said camera module receiving portion of said attaching structure, said circuit board of said camera module is vertically oriented.

3. The vehicular camera system of claim 1, wherein, with said attaching structure attached at the in-cabin side of the vehicle windshield, said camera module is vertically inserted upward into said camera module receiving portion of said attaching structure.

4. The vehicular camera system of claim 1, wherein said camera module receiving portion comprises a slot that extends upward from the opening, and wherein, with said attaching structure attached at the in-cabin side of the vehicle windshield, at least a portion of said lens of said camera module is received along the slot when said camera module is at least partially received in said camera module receiving portion of said attaching structure.

5. The vehicular camera system of claim 1, wherein a stray light shield is disposed at said attaching structure, and wherein, with said attaching structure attached at the in-cabin side of the vehicle windshield, at least a portion of said lens of said camera module is received through an aperture through said stray light shield when said camera module is at least partially received in said camera module receiving portion of said attaching structure.

6. The vehicular camera system of claim 1, wherein said camera module comprises an electrical connector that electrically connects to circuitry of said circuit board, and wherein said camera module receiving portion comprises a slot that extends upward from the opening, and wherein, with said attaching structure attached at the in-cabin side of the vehicle windshield, said electrical connector is received along the slot when said camera module is at least partially received in said camera module receiving portion of said attaching structure.

7. The vehicular camera system of claim 1, wherein said circuit board comprises a-an imager circuit board having said imager disposed thereat.

8. The vehicular camera system of claim 1, wherein said circuit board comprises a processor circuit board having an image processor operable to process image data captured by said imager.

9. The vehicular camera system of claim 8, wherein said imager is disposed at an imager circuit board accommodated in said camera module, and wherein circuitry of said imager circuit board is electrically connected to circuitry of said processor circuit board via an electrical connector.

10. The vehicular camera system of claim 9, wherein, with said attaching structure attached at the in-cabin side of the vehicle windshield and with said camera module at least partially received in said camera module receiving portion of said attaching structure, said imager circuit board of said camera module is vertically oriented.

11. The vehicular camera system of claim 9, wherein said camera module receiving portion comprises a slot that extends at least partially along a front wall of said camera module receiving portion and upward from the opening, and wherein said lens is fixed relative to said imager and said imager circuit board, and wherein, with said attaching structure attached at the in-cabin side of the vehicle windshield, at least a portion of said lens is received along the slot when said camera module is at least partially received in said camera module receiving portion of said attaching structure.

12. The vehicular camera system of claim 9, wherein said camera module comprises an electrical connector that electrically connects to circuitry of said processor circuit board, and wherein said camera module receiving portion comprises a slot that extends at least partially along a rear wall of said camera module receiving portion and upward from the opening, and wherein, with said attaching structure attached at the in-cabin side of the vehicle windshield, said electrical connector is received at the slot when said camera module is at least partially received in said camera module receiving portion of said attaching structure.

13. The vehicular camera system of claim 9, wherein, with said attaching structure attached at the in-cabin side of the vehicle windshield, said lens of said camera module is received at least partially through an aperture of a stray light shield when said camera module is at least partially received in said camera module receiving portion of said attaching structure.

14. The vehicular camera system of claim 8, wherein, with said attaching structure attached at the in-cabin side of the vehicle windshield and with said camera module at least partially received in said camera module receiving portion of said attaching structure, said processor circuit board is vertically oriented.

15. The vehicular camera system of claim 8, wherein said camera module, with said attaching structure attached at the in-cabin side of the vehicle windshield, and with said camera module at least partially received in said camera module receiving portion of said attaching structure, and responsive to image processing of image data captured by said imager, provides an output to at least one driving assistance system of the vehicle.

16. The vehicular camera system of claim 1, wherein said camera module, with said attaching structure attached at the in-cabin side of the vehicle windshield, and with said camera module at least partially received in said camera module receiving portion of said attaching structure, captures image data for at least one driving assistance system of the vehicle.

17. The vehicular camera system of claim 1, wherein said attaching structure is configured to be adhesively bonded at the in-cabin side of the vehicle windshield.

18. The vehicular camera system of claim 1, wherein said attaching structure is configured to attach at a plurality of attachment elements that are adhesively bonded at the in-cabin side of the vehicle windshield.

19. A vehicular camera system, said vehicular camera system comprising:
an attaching structure configured to adhesively attach at an in-cabin side of a vehicle windshield of a vehicle;
a camera module accommodating a circuit board and an imager, wherein said camera module comprises a lens that is aligned with said imager;
wherein said attaching structure comprises a camera module receiving portion dimensioned to receive said camera module at least partially therein;
wherein said camera module receiving portion comprises an opening, and wherein, with said attaching structure adhesively attached at the in-cabin side of the vehicle windshield, said opening is at a lower portion of said camera module receiving portion;
wherein, with said attaching structure adhesively attached at the in-cabin side of the vehicle windshield, said camera module is inserted upward through said opening and is at least partially received in said camera module receiving portion of said attaching structure to attach said camera module at said camera module receiving portion of said attaching structure adhesively attached at the in-cabin side of the vehicle windshield;
wherein, with said attaching structure adhesively attached at the in-cabin side of the vehicle windshield and with said camera module at least partially received in said camera module receiving portion of said attaching structure adhesively attached at the in-cabin side of the vehicle windshield, said imager views through the vehicle windshield and forward of the vehicle; and
wherein said camera module, with said attaching structure adhesively attached at the in-cabin side of the vehicle windshield, and with said camera module at least partially received in said camera module receiving portion of said attaching structure adhesively, captures image data for at least one driving assistance system of the vehicle.

20. The vehicular camera system of claim 19, wherein said camera module receiving portion comprises a slot that extends upward from the opening, and wherein, with said attaching structure adhesively attached at the in-cabin side of the vehicle windshield, at least a portion of said lens of said camera module is received along the slot when said camera module is at least partially received in said camera module receiving portion of said attaching structure.

21. The vehicular camera system of claim 19, wherein a stray light shield is disposed at said attaching structure, and wherein, with said attaching structure adhesively attached at the in-cabin side of the vehicle windshield, at least a portion of said lens of said camera module is received through an aperture through said stray light shield when said camera module is at least partially received in said camera module receiving portion of said attaching structure.

22. The vehicular camera system of claim 19, wherein said camera module comprises an electrical connector that electrically connects to circuitry of said circuit board, and wherein said camera module receiving portion comprises a slot that extends upward from the opening, and wherein, with said attaching structure adhesively attached at the in-cabin side of the vehicle windshield, said electrical connector is received along the slot when said camera module is at least partially received in said camera module receiving portion of said attaching structure.

23. The vehicular camera system of claim 19, wherein said circuit board comprises a-an imager circuit board having said imager disposed thereat.

24. The vehicular camera system of claim 19, wherein said circuit board comprises a processor circuit board having an image processor operable to process image data captured by said imager.

25. The vehicular camera system of claim 24, wherein said imager is disposed at an imager circuit board accommodated in said camera module, and wherein circuitry of said imager circuit board is electrically connected to circuitry of said processor circuit board via an electrical connector.

26. A vehicular camera system, said vehicular camera system comprising:
an attaching structure configured to attach at a plurality of attachment elements that are adhesively bonded at an in-cabin side of a vehicle windshield of a vehicle;
a camera module accommodating a circuit board and an imager, wherein said camera module comprises a lens that is aligned with said imager;
wherein said attaching structure comprises a camera module receiving portion dimensioned to receive said camera module at least partially therein;
wherein said camera module receiving portion comprises an opening, and wherein, with said attaching structure attached at the plurality of attachment elements that are adhesively bonded at the in-cabin side of the vehicle windshield, said opening is at a lower portion of said camera module receiving portion;
wherein, with said attaching structure attached at the plurality of attachment elements that are adhesively bonded at the in-cabin side of the vehicle windshield, said camera module is inserted upward through said opening and is at least partially received in said camera module receiving portion of said attaching structure to attach said camera module at said camera module receiving portion of said attaching structure attached at the plurality of attachment elements that are adhesively bonded at the in-cabin side of the vehicle windshield;
wherein, with said attaching structure attached at the plurality of attachment elements that are adhesively bonded at the in-cabin side of the vehicle windshield and with said camera module at least partially received in said camera module receiving portion of said attaching structure attached at the plurality of attachment elements that are adhesively bonded at the in-cabin side of the vehicle windshield, said imager views through the vehicle windshield and forward of the vehicle; and
wherein said camera module, with said attaching structure attached at the plurality of attachment elements that are adhesively bonded at the in-cabin side of the vehicle windshield, and with said camera module at least partially received in said camera module receiving portion of said attaching structure, captures image data for at least one driving assistance system of the vehicle.

27. The vehicular camera system of claim 26, wherein said camera module receiving portion comprises a slot that extends upward from the opening, and wherein, with said attaching structure attached at the plurality of attachment elements that are adhesively bonded at the in-cabin side of the vehicle windshield, at least a portion of said lens of said camera module is received along the slot when said camera module is at least partially received in said camera module receiving portion of said attaching structure.

28. The vehicular camera system of claim 26, wherein a stray light shield is disposed at said attaching structure, and wherein, with said attaching structure attached at the plurality of attachment elements that are adhesively bonded at the in-cabin side of the vehicle windshield, at least a portion of said lens of said camera module is received through an aperture through said stray light shield when said camera module is at least partially received in said camera module receiving portion of said attaching structure.

29. The vehicular camera system of claim 26, wherein said camera module comprises an electrical connector that electrically connects to circuitry of said circuit board, and wherein said camera module receiving portion comprises a slot that extends upward from the opening, and wherein, with said attaching structure attached at the plurality of attachment elements that are adhesively bonded at the in-cabin side of the vehicle windshield, said electrical connector is received along the slot when said camera module is at least partially received in said camera module receiving portion of said attaching structure.

30. The vehicular camera system of claim 26, wherein said circuit board comprises a-an imager circuit board having said imager disposed thereat.

31. The vehicular camera system of claim 26, wherein said circuit board comprises a processor circuit board having an image processor operable to process image data captured by said imager.

32. The vehicular camera system of claim 31, wherein said imager is disposed at an imager circuit board accommodated in said camera module, and wherein circuitry of said imager circuit board is electrically connected to circuitry of said processor circuit board via an electrical connector.

* * * * *

UNITED STATES PATENT AND TRADEMARK OFFICE
CERTIFICATE OF CORRECTION

PATENT NO. : 11,718,243 B2
APPLICATION NO. : 17/448060
DATED : August 8, 2023
INVENTOR(S) : Brian J. Winden Page 1 of 1

It is certified that error appears in the above-identified patent and that said Letters Patent is hereby corrected as shown below:

In the Claims

Column 9
Line 12, Claim 7, "a-an imager" should be --an imager--

Column 11
Line 14, Claim 23, "a-an imager" should be --an imager--

Column 12
Line 44, Claim 30, "a-an imager" should be --an imager--

Signed and Sealed this
Fifth Day of September, 2023

Katherine Kelly Vidal
*Director of the United States Patent and Trademark Office*